May 3, 1955     W. KASTEN     2,707,562
FILTER
Filed April 17, 1952
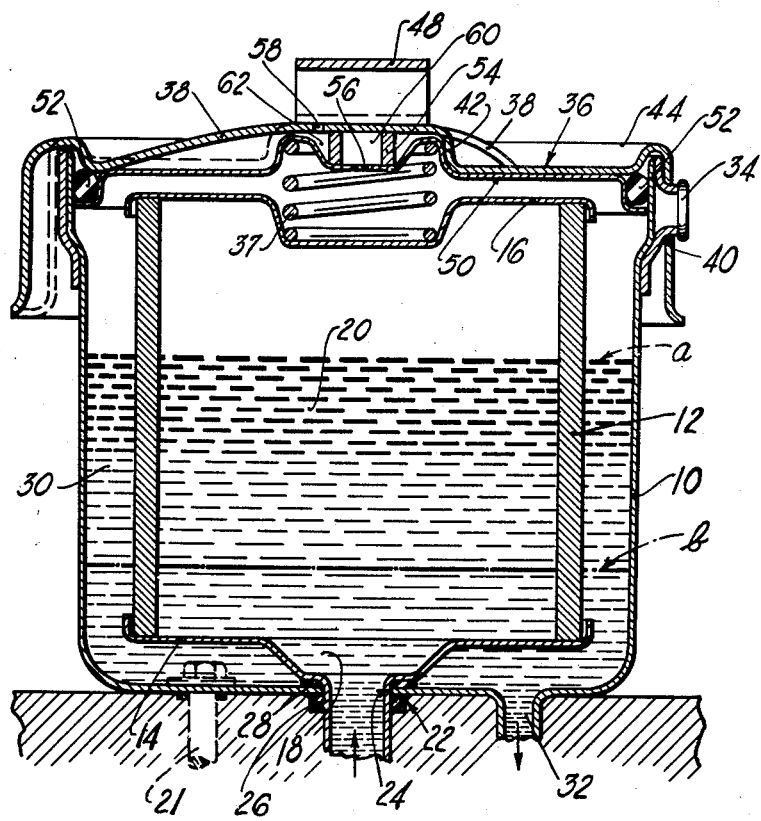
INVENTOR.
WALTER KASTEN
BY
M. A. Hobbs
ATTORNEY

2,707,562

FILTER

Walter Kasten, Detroit, Mich., assignor to Bendix Aviation Corporation, South Bend, Ind., a corporation of Delaware Application April 17, 1952, Serial No. 282,860

7 Claims. (Cl. 210—166)

This invention relates to filter units and more particularly to a compact filter unit combination comprising a primary hydraulic fluid filtering element and a secondary air filtering element housed in a hydraulic fluid reservoir.

It is a primary object of this invention to provide, in such a system, air filtering means co-acting with primary hydraulic fluid filtering means whereby uncontaminated fluid may at all times be supplied from a reservoir to other components of a hydraulic system.

Another object of this invention is to provide a combination of filtering elements and a reservoir for filtering different fluids, whereby a source of supply of fully filtered fluid is at all times available, said combination being especially adaptable for use in a hydraulic steering system for internal combustion engines.

Another object of this invention is to provide a simple and compact unitary structure including a hydraulic fluid reservoir, a hydraulic fluid filter element, filter element by-pass valve means and air filter means included in an air breather.

Other objects and advantages of the present invention will become apparent from the following description and accompanying drawing, wherein a vertical cross-section of my reservoir and filtering device is shown with the several parts thereof shown in operative relation.

The single figure of the drawing shows a vertical section of the filter embodying the invention.

Referring more specifically to the drawing, numeral 10 indicates a cylindrical filter housing and reservoir within which a cylindrical hydraulic fluid filtering element 12 is contained and held in spaced relation to the walls of said reservoir by substantially disc-shaped retainer plate 14 and combined retainer element and by-pass valve 16, said retainer plate being formed with a hollowed hub portion 18 which acts as an inlet conduit for unfiltered fluid from the discharge side of a pump (not shown) to the chamber 20. Reservoir 10 is adapted to be attached to the housing of a pump by connecting means such as the bolt shown at 21. The filtering element 12 may be of any suitable kind, such as a helically wound ribbon type as shown in my Patent 2,421,704. A circular aperture 24 in reservoir 10 provides lateral holding structure for the hub 18, and a depression 22 in the pump body retains a sealing ring 26, the seal 28 encircling hub 18 as shown, whereby the filtered fluid in reservoir chamber 30 cannot become contaminated by leakage of unfiltered liquid from the pump discharge through aperture 24. An outlet passage 32 in housing 10 connects chamber 30 with some element in a device, such as a servo motor piston in a hydraulic steering mechanism for automobiles (not shown).

A reservoir cap means 36 having structural strengthening ribs 38 is adapted to be tightened on the reservoir by a bayonet type fitting, which includes a plurality of lugs rigidly attached to housing 10, one of which is shown at 34, and elongated sloping apertures in the skirt of cap means 36, one of which is sectionally shown at 40. Cap 36 may be tightened against the resistance of a spring 37 by turning said cap relative to the lugs 34 in the elongated sloping apertures 40. The cap contains a central raised portion 42 concentric with circumferential cap boundary section 44. A U-shaped channel section 48 is rigidly attached to the uppermost portion of portion 42, into which a bar or rod may be inserted and rotated to tighten cap 36. A formed spring and O ring retainer plate 50 is adapted to resiliently engage the spring 37 and includes an S section near its periphery for retaining an O ring sealing means 52. A filtering element 54 of any suitable kind, such as the cylindrical helically wound ribbon type previously mentioned, is supported by retainer plate 50 in the U-shaped central portion thereof. The filtered fluid chamber 30 communicates with the surrounding atmosphere through the vent 56, the chamber 60 as formed between retainer 50, cap 36 and the filter element 54, the filter element 54, chamber 62 and vent 58. With this arrangement no separate structure is necessary for installation of the breather filter, which is compressively held in position between cap 36 and retainer plate 50.

After the entire unit is assembled and the cap 36 is positioned to engage lugs 34 said unit is ready for installation in a hydraulic system. Tightening of the cap 36 tends to compress all compressible units within the reservoir 10; i. e. filter elements 12 and 54, and the spring 37, to exert a predetermined force on the retainer and by-pass valve 16, the retainer plate 50, and sealing rings 28 and 52.

In operation, inlet passage 18 initially receives unfiltered pressurized hydraulic fluid from the discharge side of a pump (not shown), said fluid then passing into chamber 20 thence through the filter element 12, where all contaminating matter is separated from the fluid. The filtered fluid remains in chamber 30 until it is needed in the operation of some component part of the hydraulic system (not shown), such as a servo valve of a hydraulic steering mechanism for automobiles. This initial phase of operation may be termed the charging cycle, since the chambers 20 and 30 in reservoir 10 are filled to some predetermined level $a$ following the filling of various passages which may be connected to outlet 32. Chamber 30 is the supply source of filtered hydraulic fluid; and when there is a demand for said fluid by a device downstream of outlet 32, the fluid level will fall to some predetermined level such as $b$. When this occurs the air breather assembly is operative to maintain atmospheric pressure in the unfilled portions of chambers 20 and 30, by allowing unfiltered air from the surrounding atmosphere to flow through vent 58 and chamber 62 to air filter element 54, and filtered air to flow into chamber 60, through vent 56 and into chamber 30, thence through filter element 12 into chamber 20. When the demand for fluid from reservoir 10 ceases the fluid level will again rise to $a$ thereby reversing the flow of air through the air breather assembly so that atmospheric pressure is at all times maintained in the unfilled portions of chambers 20 and 30.

In the event that filter element 12 becomes so clogged with contaminating matter that the fluid no longer flows therethrough, chamber 20 will fill and the fluid pressure exerted on retainer and by-pass valve element 16 will be sufficient to compress spring 37, thereby allowing the fluid to by-pass filter element 12 and supply unfiltered fluid to chamber 30 and the hydraulic system downstream thereof.

Although only one embodiment of the invention has been illustrated herein, various changes or modifications in the arrangement of the filtering device and parts thereof may be made to suit requirements.

I claim:

1. A fluid purifying device comprising a reservoir, a cylindrical liquid-filtering element for providing edge filtration in said reservoir, means supporting said filtering element inside said reservoir including a first retainer element and a second retainer element movable relative to the filter element, means defining an unfiltered liquid chamber in said reservoir, means defining a filtered liquid chamber in said reservoir, a liquid inlet passage means in said reservoir communicating with one of said chambers, a liquid outlet passage means in said reservoir communicating with the other of said chambers, air breather means including an air filtering element of the ribbon type for providing edge filtration of the air passing into said reservoir, third retainer means operatively connected to said second retainer means by resilient means, an air passage means in said third retainer means, cap means for enclosing and sealing said reservoir from fluid leakage and unfiltered air, and vent means in said cap means, said vent means being arranged to communicate with said reservoir through said air filtering element and said last mentioned passage means, and said air filtering elements being rigidly positioned by means of said third retainer means and said cap means, whereby fully purified liquid is at all times contained in said reservoir when the filtering device is in operation.

2. A fluid filtering device comprising a reservoir, a liquid filter element in said reservoir, means defining first and second chambers in said reservoir, a liquid inlet passage means in said first chamber, a liquid outlet passage means in said second chamber, by-pass valve means arranged for allowing liquid to flow from said first chamber to said second chamber only after said first chamber has filled with pressurized liquid, and air breather means including a cover for said reservoir having a vent, a retainer plate having a vent, and an air filter element operatively positioned between said vents in communication with said second chamber for insuring the entrance of purified air to said second chamber as the liquid level in said second chamber falls when the filtering device is in operation.

3. In combination, a reservoir, a liquid filter element in said reservoir, means including said filter element defining first and second chambers in said reservoir, means defining a liquid inlet passage in one of said chambers, means defining a liquid outlet passage in the other of said chambers, by-pass valve means arranged for allowing liquid to flow from one of said chambers to the other of said chambers including a member, reservoir sealing means and air breather means including means defining an air passage in said sealing means, means defining an air passage in said member, and an air purifying element adapted to be positionally held by said sealing means and said member, said first mentioned air passage communicating with one of said chambers through said last mentioned element and said last mentioned air passage.

4. A fluid purifying device comprising a reservoir, a cylindrical liquid-filtering element of the helically wound ribbon type for providing filtration in said reservoir, upper and lower end plates adapted to maintain said filtering element in spaced relation to the walls of said reservoir, an unfiltered liquid chamber on one side of said element, means defining a liquid inlet passage communicating with said chamber, a filtered liquid chamber on the other side of said element, means defining a liquid outlet passage communicating with said last mentioned chamber, and means for closing and providing an air breather for said reservoir including a cover having an air vent, a retainer plate having an air vent, an air filtering element of the helically wound ribbon type positioned between said cover and said retainer plate in such manner that communication between said vents can only occur across said element, and a spring located between said retainer plate and said upper end plate.

5. In combination, a reservoir, a cap for said reservoir having a vent therein, a cylindrical liquid filtering element in said reservoir, upper and lower end plates maintaining said filtering element in spaced relation to the walls of said reservoir, by-pass valve means in said reservoir including said upper end plate, a retainer plate having a vent therein, resilient means maintaining said upper end plate and said retainer plate in spaced relation, said resilient means urging said upper end plate into sealing position with an open end of said filtering element, and an air breather means including an air filtering element operatively positioned between said vents for providing filtration of the air passing into said reservoir.

6. In combination, a reservoir having a fluid inlet passage and a fluid outlet passage, a liquid filtering element operatively positioned between said inlet and outlet passages, by-pass valve means in said reservoir including an end cap, a cover for said reservoir having a vent, a retainer plate in said reservoir having a vent, and an air filter operatively positioned between said vents for maintaining internal reservoir pressure substantially equal to the pressure on the air external to the reservoir.

7. A fluid filtering device comprising a cylindrical container having a fluid inlet passage and a fluid outlet passage; a cylindrical edge-type filtering element in said container operatively positioned between said inlet passage and said outlet passage; and means for maintaining the position of said filtering element in said container including a bottom end plate and a top end plate having a depression in the center thereof, a spring seated in said depression, a retainer plate having a downwardly extending peripherial groove and an upwardly extending center portion for receiving the upper end of said spring, a flexible O-ring in said groove, a cover for said container engaging and exerting a downward force on said retainer plate, means defining passageways through said cover and through said container plate, and an edge-type air filter so positioned that all air passing from one of said passageways to the other must pass through said air filter.

References Cited in the file of this patent

UNITED STATES PATENTS

| | | |
|---|---|---|
| 1,952,740 | Winslow | Mar. 27, 1934 |
| 2,421,704 | Kasten | June 3, 1947 |
| 2,577,217 | Stafford | Dec. 4, 1951 |